United States Patent
Staring et al.

(10) Patent No.: US 8,296,582 B2
(45) Date of Patent: *Oct. 23, 2012

(54) METHOD AND SYSTEM FOR PROVIDING COPY-PROTECTION ON A STORAGE MEDIUM AND STORAGE MEDIUM FOR USE IN SUCH A SYSTEM

(75) Inventors: Antonius Adriaan Maria Staring, Eindhoven (NL); Pieter Bas Ijdens, Eindhoven (NL); Robert Jochemsen, Eindhoven (NL); Ronald Marcel Tol, Eindhoven (NL)

(73) Assignee: Koninklijke Philips Electronics N.V., Amsterdam (NL)

( * ) Notice: Subject to any disclaimer, the term of this patent is extended or adjusted under 35 U.S.C. 154(b) by 383 days.

This patent is subject to a terminal disclaimer.

(21) Appl. No.: 11/674,490

(22) Filed: Feb. 13, 2007

(65) Prior Publication Data

US 2007/0162982 A1    Jul. 12, 2007

Related U.S. Application Data

(63) Continuation of application No. 09/700,383, filed on Nov. 14, 2000, now Pat. No. 7,178,036.

(30) Foreign Application Priority Data

Mar. 15, 1999  (EP) ..................................... 99200776
Mar. 26, 1999  (EP) ..................................... 99200930

(51) Int. Cl.
  *G06F 11/00*  (2006.01)
  *H04L 9/32*   (2006.01)

(52) U.S. Cl. ..................................... 713/193

(58) Field of Classification Search .................. 380/222, 380/44, 46, 264, 201, 277, 268; 713/162, 713/189, 193

See application file for complete search history.

(56) References Cited

U.S. PATENT DOCUMENTS

| | | |
|---|---|---|
| 4,757,534 A | 7/1988 | Matyas et al. |
| 5,627,655 A | 5/1997 | Okamoto et al. |
| 5,638,443 A | 6/1997 | Stefik et al. |
| 5,892,900 A | 4/1999 | Ginter et al. |
| 5,917,908 A | 6/1999 | Takenaka et al. |

(Continued)

FOREIGN PATENT DOCUMENTS

EP    0575765    12/1993

(Continued)

OTHER PUBLICATIONS

Advanced Access Content System, Recordable Video Book, Revision 0.91, dated Feb. 17, 2006.

(Continued)

*Primary Examiner* — Beemnet Dada (57) ABSTRACT

In a method for providing copy-protection services on a storage medium (for instance a solid state memory module), the data are arranged in sectors to which a field (S4T) is associated, where said field contains a random value $R_i$ which is changed randomly when writing data to said sector. By encrypting the data stored on the medium using a key which depends critically on said random numbers, bit-by-bit copies (apart from said random numbers, which can not be deterministically changed by an application) to a second storage medium or recopies from some intermediate storage medium, can not be decrypted because the values of said random numbers will have changed, thus preventing unauthorized duplication and replay attacks.

39 Claims, 6 Drawing Sheets

U.S. PATENT DOCUMENTS

| | | |
|---|---|---|
| 6,000,030 A | 12/1999 | Steinberg et al. |
| 6,064,751 A | 5/2000 | Smithies et al. |
| 6,104,679 A | 8/2000 | Sollish |
| 6,128,260 A | 10/2000 | Tanoue et al. |
| 6,226,618 B1 | 5/2001 | Downs et al. |
| 6,343,281 B1 | 1/2002 | Kato |
| 6,535,858 B1 | 3/2003 | Blaukovitsch et al. |
| 6,580,682 B1 | 6/2003 | Kamperman et al. |
| 6,658,566 B1 | 12/2003 | Hazard |
| 2001/0042043 A1 | 11/2001 | Shear et al. |
| 2002/0023219 A1 | 2/2002 | Treffers et al. |
| 2003/0185130 A1 | 10/2003 | Kamperman et al. |
| 2008/0288412 A1 | 11/2008 | Treffers et al. |

FOREIGN PATENT DOCUMENTS

| | | |
|---|---|---|
| EP | 0745925 A2 * | 12/1996 |
| EP | 1 020 856 A2 | 7/2000 |
| FR | 2760871 | 9/1998 |
| KR | 1999-013756 A | 2/1999 |
| WO | 97/43761 A2 | 11/1997 |
| WO | 00/55861 A1 | 9/2000 |
| WO | WO01/33317 A1 | 5/2001 |

OTHER PUBLICATIONS

Advanced Access Content System, Pre-recorded Video Book, Revision 0.92, dated Nov. 29, 2007.

Advanced Access Content System, Introduction and Common Cryptographic Elements, Revision 0.91, dated Feb. 17, 2006.

Advanced Access Content System, Recordable Video Book, Final Revision 0.951, dated Sep. 28, 2009.

Advanced Access Content System, Prepared Video Book, Revision 0.951, dated Sep. 28, 2009.

Advanced Access Content System, Pre-recorded Video Book, Revision 0.951, dated Sep. 28, 2009.

Advanced Access Content System, Introduction and Common Cryptographic Elements Book, Revision 0.951, dated Sep. 28, 2009.

* cited by examiner

| Sector data | S4T |
|---|---|
| $ID_A$, Enc [$K_{Pub,A}$; S, $ID_A$, x, y] | $T_1$ |
| $ID_A$, Enc [$K_{Priv,A}$; H[$T_1$, S, $ID_A$, x, y]] | $T_2$ |
| $ID_B$, Cert ($K_{Pub,B}$) | ... |
| | |
| | |
| E [K; audio] | $T_J$ |
| ... | ... |
| E [K; audio] | $T_N$ |
| rights info | $T_{N+1}$ |
| usage info | $T_{N+2}$ |
| Enc [H [$T_J$, ..., $T_N$, $T_{N+1}$, $T_{N+2}$, S]; K] | ... |

FIG. 8

| Sector data | S4T |
|---|---|
| $ID_A$, Enc [$K_{Pub,A}$; S, $ID_A$, x, y] | $T_1$ |
| $ID_A$, Enc [$K_{Priv,A}$; H[$T_1$, S, $ID_A$, x, y]] | $T_2$ |
| $ID_B$, Enc [$K_{Pub,B}$; S, $ID_A$, $T_1$, $T_2$] | $T_3$ |
| | |
| | |
| E [K; audio] | $T_J$ |
| ... | ... |
| E [K; audio] | $T_N$ |
| rights info | $T_{N+1}$ |
| usage info | $T_{N+2}$ |
| Enc [H [$T_J$, ..., $T_N$, $T_{N+1}$, $T_{N+2}$, S]; K] | ... |

FIG. 9

| Sector data | S4T |
|---|---|
| $ID_A$, Enc[$K_{Pub,A}$; S, $ID_A$, x, y] | $T_1$ |
| $ID_A$, Enc[$K_{Priv,A}$; H[$T_1$, S, $ID_A$, x, y]] | $T_2$ |
| $ID_B$, Enc[$K_{Pub,B}$; S, $ID_B$, p, q] | $T_3$ |
| $ID_B$, Enc[$K_{Priv,B}$; H[$T_3$, S, $ID_B$, p, q]] | $T_4$ |
| | |
| E[K; audio] | $T_J$ |
| ... | ... |
| E[K; audio] | $T_N$ |
| rights info | $T_{N+1}$ |
| usage info | $T_{N+2}$ |
| Enc[H[$T_J$, ..., $T_N$, $T_{N+1}$, $T_{N+2}$, S]; K] | ... |

FIG. 10

| Sector data | S4T |
|---|---|
| $ID_A$, Enc[$K_{Pub,A}$; S, $ID_A$, x, y] | $T_1$ |
| $ID_A$, Enc[$K_{Priv,LMC}$; H[$T_1$, S, $ID_A$, x, y]] | $T_2$ |
| $ID_B$, Enc[$K_{Pub,B}$; S, $ID_B$, p, q] | $T_3$ |
| $ID_B$, Enc[$K_{Priv,LMC}$; H[$T_3$, S, $ID_B$, p, q]] | $T_4$ |
| $ID_{LMC}$ Cert($K_{Pub,LMC}$) | ... |
| E[K; audio] | $T_J$ |
| ... | ... |
| E[K; audio] | $T_N$ |
| rights info | $T_{N+1}$ |
| usage info | $T_{N+2}$ |
| Enc[H[$T_J$, ..., $T_N$, $T_{N+1}$, $T_{N+2}$, S]; K] | ... |

FIG. 11

METHOD AND SYSTEM FOR PROVIDING COPY-PROTECTION ON A STORAGE MEDIUM AND STORAGE MEDIUM FOR USE IN SUCH A SYSTEM

CROSS-REFERENCE TO RELATED APPLICATIONS

This application is a continuation of application Ser. No. 09/700,383 filed Nov. 14, 2000, which issued as U.S. Pat. No. 7,178,036.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A SEQUENCE LISTING

Not applicable.

BACKGROUND OF THE INVENTION

The invention relates to a method for providing copy-protection to a data storage medium, in particular to solid state memory modules. The method is in particular useful for, but not restricted to, devices in which a removable random access memory module can be inserted such as for instance portable play back devices. With advancing technology, next generations of portable audio playback and recording devices will be based on solid state technology. Arguments in favor are based on weight, power and shockproofness considerations.

DESCRIPTION OF RELATED ART

Software providers, e.g. music publishers, require measures against unauthorized copying of the digitally stored information, with little or preferably no inconvenience to an authorized user. In addition, the method and system should support such business models as rental, try-before-you-buy, and controlled copying (e.g. super distribution). A particular problem is posed by devices that can potentially access all information on the storage media, without complying with protection standards.

It should be prevented to make perfect bit copies of the storage medium such that the duplicates both play simultaneously in different players.

A solution to this requirement is to encrypt the data (for instance audio) using a property of the storage media (for instance removable solid state memory modules) which is unique for each storage medium and which cannot be changed. For example, one could encrypt audio data using a key which is derived at least in part from a "module ID" which cannot be modified by a user, where the module ID is a fixed number (e.g. a serial number).

Alternatively, a "fingerprint" of each storage medium may be obtained from the location of bad (defect) blocks on the medium, which subsequently can be used as the module ID. Since the key is specific to the storage medium, a copy of the content on other storage medium can not be decrypted.

However, this approach does not protect against replay attacks, which can be seen as follows. Once the content, e.g. audio, is stored on the storage medium, it can be read off the storage medium using a non-compliant device, and stored in an archive. The audio content can not be played from the archive because it is stored in encrypted form. However, as soon as the content on the storage medium has been expired or otherwise become unusable, it can be replaced by a fresh copy from the archive. It is clear that this can be repeated indefinitely, and as such methods for copy-protection based on unique ID's as described above are not suitable to implement new business models such as rental etc.

One solution to overcome this problem is to equip the storage medium with a smart card IC, which controls access to the memory using some authentication protocol (e.g. based on public key cryptography). This would prevent a non-compliant device to copy the module content to an archive, and subsequently to restore it after the original on the module has been expired. However, this may be to costly a solution. In addition, due to the limited processing power of such an IC, an authentication protocol based on public key cryptography may result in an unacceptable delay before the audio starts playing.

It is therefore an object of the invention to provide an improved copy protection method and system, in particular against replay attacks, in a simple manner.

BRIEF SUMMARY OF THE INVENTION

Now, therefore according to one of its aspects the invention is characterized according to the characterizing part of Claim 1, i.e. that the stored data is arranged in sectors, a tagging part being associated with each sector, where the tagging part comprises a field (S4T) that stores a value which is randomly altered with each write access to said sector, said field being read only for external access, and the stored data being encrypted with an encryption key that is at least in part derived from at least some of said fields (S4T).

The method and the storage medium architecture in accordance with the invention provide a flexible scheme for providing copy protection. The core of the invention is that each sector on the storage medium has an associated field (named below the "Secure Solid Sate Sector Tag" or S4T) which stores a random number. This random number is renewed on each write operation to that sector by some preferably dedicated (and in case of solid state memory modules preferably on-chip) logic, and can not be modified deterministically by devices employing the module. This can be used to prevent replay attacks by encrypting the content stored on the medium using a key which is at least in part derived from the random numbers associated with the sectors in which it is stored.

The invention also relates to a system arranged for implementing a method as claimed in claim 1, a player for playing a recording prepared according to a method as claimed in claim 1, and a record carrier prepared according to a method as claimed in claim 1. Further advantageous aspects of the invention are recited in dependent claims.

These and other objects of the invention will be apparent from and elucidated with reference to the embodiments described hereinafter.

DETAILED DESCRIPTION OF THE INVENTION

The invention is exemplified below by reference to audio and removable random access (solid state) memory modules, but the invention is not limited to audio nor to removable random access memory models, it is applicable to any kind of data stored on a data storage unit, such as for instance audio, video, text or any combination thereof. It is also applicable to storage media and data storage units in general, such as for instance to hard disks.

In relation to audio players and related devices it is noted that it is preferred that the method protects the interests of the content providers, be it the major record labels or small garage bands, yet addresses consumer interests such as convenience, sound quality, and privacy.

Figure 1:
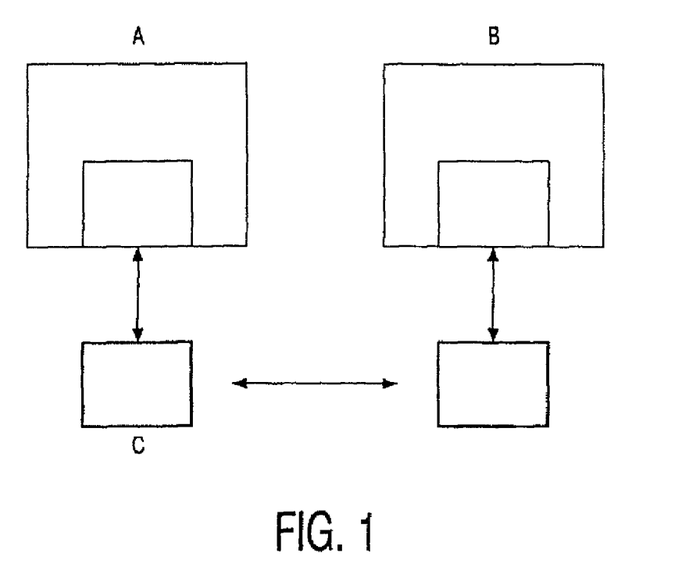
FIG. 1 shows a conceptual two-player arrangement

FIG. 1 illustrates a conceptual two-player arrangement, with two players A and B, and a module C that may be transposed between the players. As shown, both players have appropriate means for inserting the module.

Basically, two approaches exist for copy protection. The first is to bind the audio to a specific player by providing each individual player with a unique, secret, number that is used as the key for encryption of the audio. Therefore, the audio stored on memory modules by one player will play on that player only. Of course, this is very annoying if one has multiple players (for instance SSA players). It is required that one is able to play music stored on a memory module, regardless of the device used to download it onto the module. What should be prevented is that a user can copy the audio content to another module and be able to play from both.

One known solution is to embed a unique identification code (ID) in the memory module, which can be read by the application, but which can not be changed. This identification code can then be used to generate an encryption key, which is specific for the module.

Another known solution is to make use of defects in the memory modules, which naturally occur as a result of the manufacturing processes used to fabricate cheap but high storage capacity memories. The locations of these natural defects probably will be unique for each module, and as such can act as a 'fingerprint' of that device. Again, a unique key can be generated, which is specific for the module.

Figure 2:
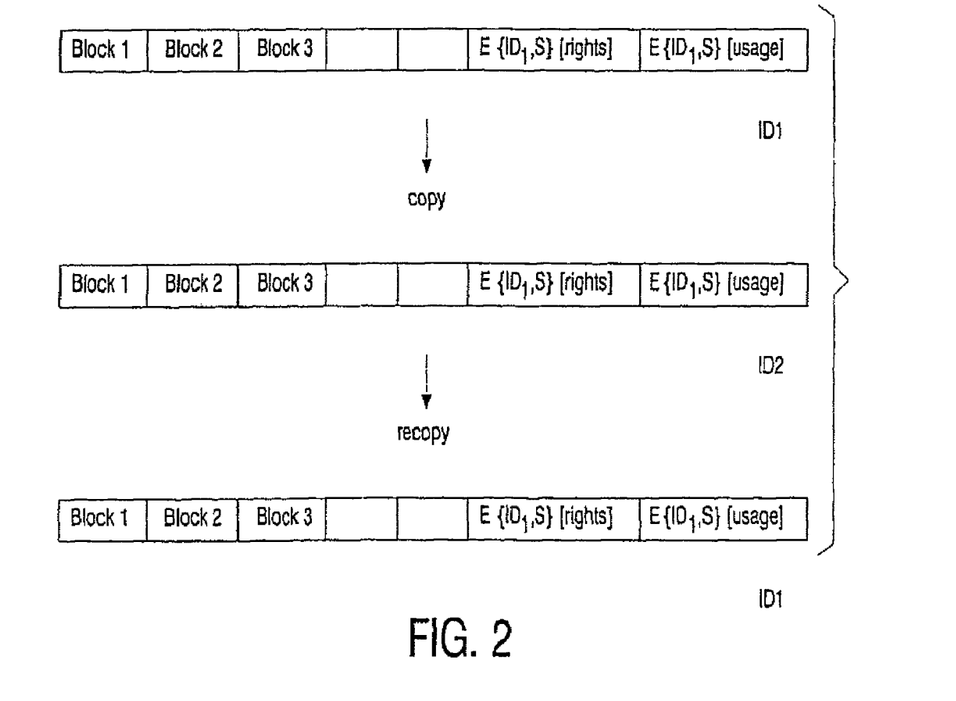
FIG. 2 illustrates the mechanism of 'replay attacks' in the prior art.

These known solutions do not provide protection against replay attack as will be explained in FIG. 2 below. A 'replay attack' is a form of copying in which a copy is made from one system (system 1) to another (system 2), where the unauthorized (but unplayable copy) on system 2 can be used to restore a playable copy on system 1 over and over again, even after expiration of the original copy. FIG. 2 illustrates this in more detail. Each system comprises a unique identification number, represented by ID1 for system 1 and ID2 for system 2. In this example the data in respect of rights and usage on the original copy are encrypted with a key that is derived from ID1 and a secret S. In a 'try-before-you-buy' or a rental business model, further access to the data is denied after a certain period of time, or after a number of uses. In the known system, data on the original system are encrypted with a key that is derived from ID1. So copying the data to a system having a unique identification code ID2 (second step in FIG. 2) will not render a usable copy, since the identification code does not match the code ID1. However, this copy is exactly (bit-by-bit) the same as the original. It can at any time be recopied back from system 2 to system 1 and this copy of a copy can be used. This enables a fraudulent customer to retain on system 2 a copy that can be recopied again and again on system 1 and will be usable. 'Try-before-you-buy' thus has become 'try-indefinitely.' Likewise, this scheme can be used to pay once for a rental and have a copy for ever.

The method in accordance with the invention herein is relatively inexpensive. The basic idea to prevent a replay attack requires to design storage media which enter different states, even though the data to be stored are identical. The method is presented using an example of a solid state module but is applicable to other kinds of storage modules that have some simple control logic built in (e.g. hard disc drives etc.). The invention provides a flexible framework for building a copy protection system, without imposing limitations on the usage of the module.

Current flash memory modules for solid state hard disk and multimedia storage applications are organized in 512 byte sectors. Associated with each sector is a tag area (usually 16 bytes), which is employed to store e.g. a bad block flag, a usage count (to implement wear leveling), and error correction information. This data typically is maintained by an on-board controller or by the application. In the invention the tag area (or part of the tag area) of each sector is extended with a so-called "Secure Solid State Sector Tag," or S4T for short or a second or separate tag area is introduced (below also called a S4T). This S4T field will contain a random number, and has the following two basic properties: the random number is changed on each write access to the sector by some (preferably on-chip) logic; it can not be modified by devices employing the module, i.e. it is read-only for external accesses.

Figure 3:
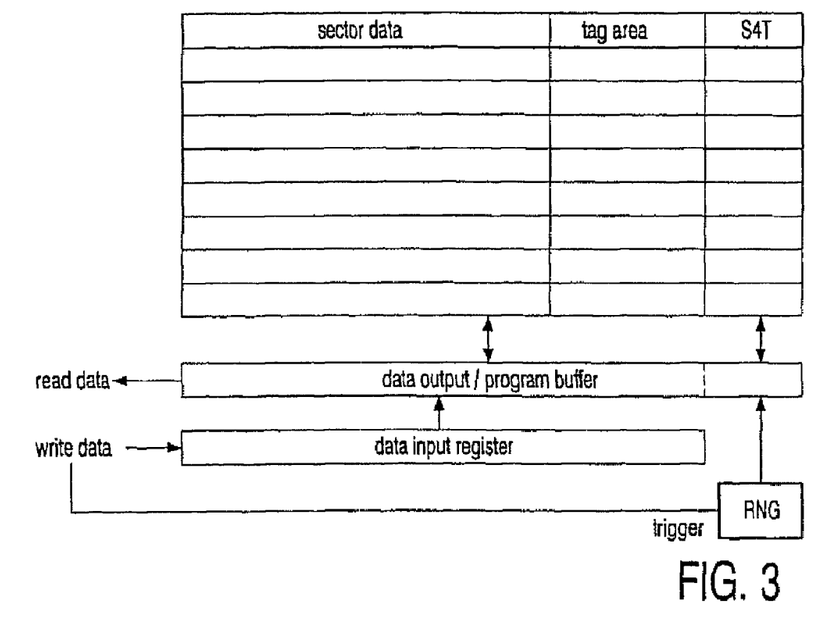
FIG. 3 shows a schematic logic architecture of a memory module

FIG. 3 illustrates a schematic logic architecture of a memory module in accordance with the invention. The S4T field may advantageously and preferably be integrated inside the memory chip. As shown, the write data operation to a sector will trigger the random number generation RNG, and input the latter together with the data proper through an input register and a buffer into main storage. In a read operation, the data proper and the value stored in the S4T field will leave through this buffer again. Storage proper has the sector data, the tag area, and the S4T field.

Figure 4A:
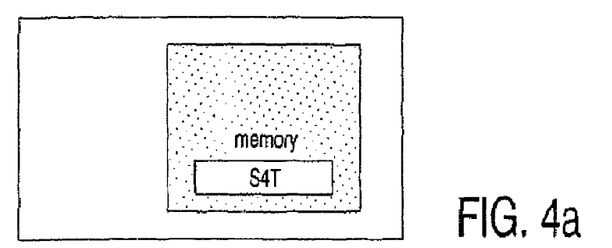
FIGS. 4a-4c various examples of a memory module
Figure 4B:
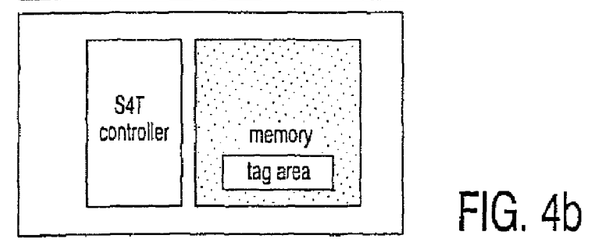
Figure 4C:
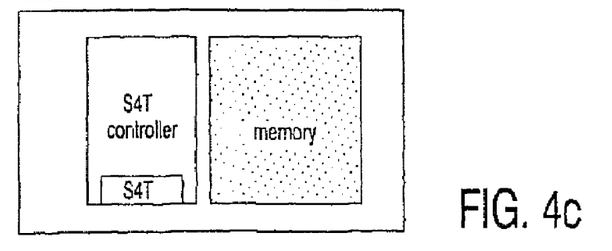

FIG. 4a-4c illustrate various examples of memory modules. FIG. 4a has the preferred embodiment with all information combined within the memory chip itself. FIG. 4b has an external S4T controller. FIG. 4c has an external S4T controller, as well as an external S4T storage. An initial realization could be to have a memory chip on the module, alongside with the controller. The latter will generate the random numbers, reserve part of the tag area for storing the random numbers, and block write operations to the reserved part of the tag area other than those for storing the random numbers. For clarity, no interconnections have been detailed.

The S4T field can be exploited within the framework of the invention to construct a copy protection system, which is resistant against replay attacks and thus enables new business models to be implemented, as follows. The content is stored on the memory module in an encrypted form, either using a single key, or using a set of different keys in the case of block wise encryption. The rights which have been purchased with the content, and the usage information can also be stored on the module. These need not necessarily be encrypted. Finally, the key(s) used to encrypt the content are stored on the module, encrypted with a key that is derived at least in part from the value of the S4T fields of the sectors in which the rights and usage information is stored, a secret (e.g. a key that is shared by all or a group of players), and optionally or alternatively to the value of the S4T fields of the rights and usage sectors the values of some or all of the values in the S4T fields of the sectors in which the content is stored.

Preferably the key is derived from at least the value of a sector in which rights information and/or a sector in which usage information is stored because preventing copying the usage and/or rights information is a very efficient manner of protection. A fraudulent user may attempt not so much to copy all information of a medium, but only the user and/or rights information. For instance when a user is allowed to use a recording 10 times, he/she could make a copy of only the user and/or right information and after having played the recording 10 times, attempt a 'replay attack' by only recopying the user and/or rights information. If successful the recording may be played yet another 10 times etc.

Figure 5:
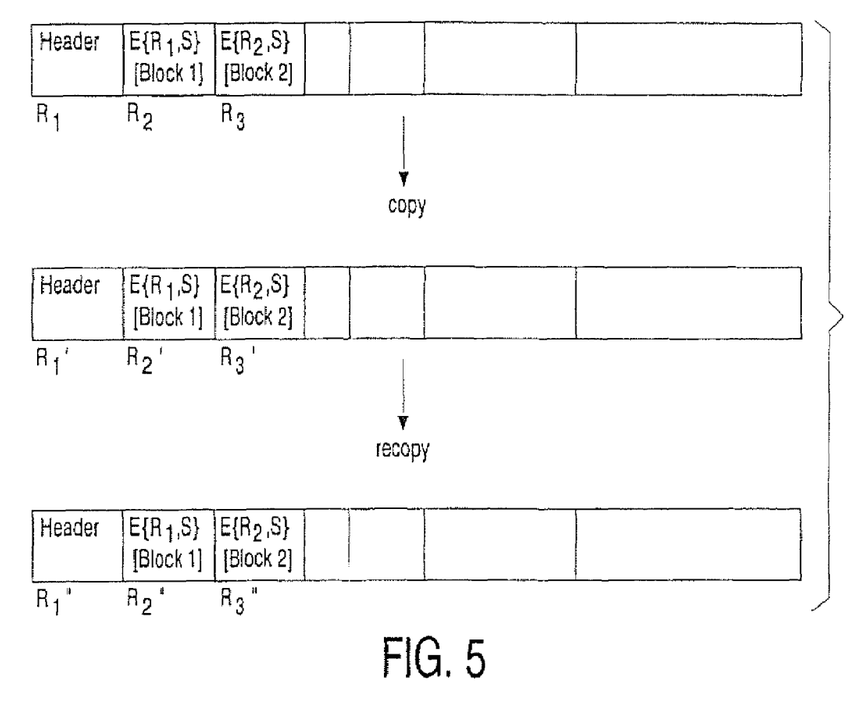
FIG. 5 a usage example of an S4T value

FIG. 5 illustrates a method in accordance with the invention. Each time data are stored in a sector, in its S4T field a randomly chosen number is written. In FIG. 5 these random numbers are below the sectors indicated by $R_1$, $R_2$ etc. The data are encrypted with a key that is dependent on a secret S and the number $R_i$ or a combination of numbers $R_i$.

Making a copy of the data on the memory module will change in a irreproducible manner the numbers $R_i$ (see FIG. 5). In fact such will happen twice. Therefore, a recopy of a copy will have data for which the random numbers ($R_1''$, $R_2''$ etc) do not correspond to the arguments required for a proper decryption of the data. Subsequently, the encryption key can no longer be recovered and the copy of the copy cannot be decrypted and is useless. Any 'replay attack' is prevented.

To expand on this description, an exact bit copy of the audio content can be made to an intermediate storage device (e.g. a PC hard disk) since there are no restrictions whatsoever to reading the memory. However, this copy is unusable because it is encrypted with a key that can not be obtained because the secret is unknown to non-compliant applications. On each play back of the audio content, the usage information is updated and checked against the rights. If the content has not been expired, the updated information is stored in the memory, and the key(s) used to encrypt the content are re-encrypted using the new value S4T fields of the sectors in which the rights and usage information is stored. Now suppose that the audio content has been expired, and the bit copy has been placed back in memory. The result is not an exact bit copy, because the values in the S4T fields have been changed randomly on each write access to the memory. Therefore, the player will fail to recover the key(s) used to encrypt the audio content, since this requires the original values of the S4T fields (which are on the intermediate storage device, but can not be placed back in the memory module). Accordingly, the replay attack fails.

A further potential attack would be to change the rights and usage information, which may have been stored in the clear (i.e. not encrypted). Again, the value of the S4T field of the sectors in which this information is stored will be irrevocably changed, thus rendering recovery of the key(s) used to encrypt the content impossible. Again, the attack fails (even if the rights and usage information is stored in the clear).

Figure 6A:
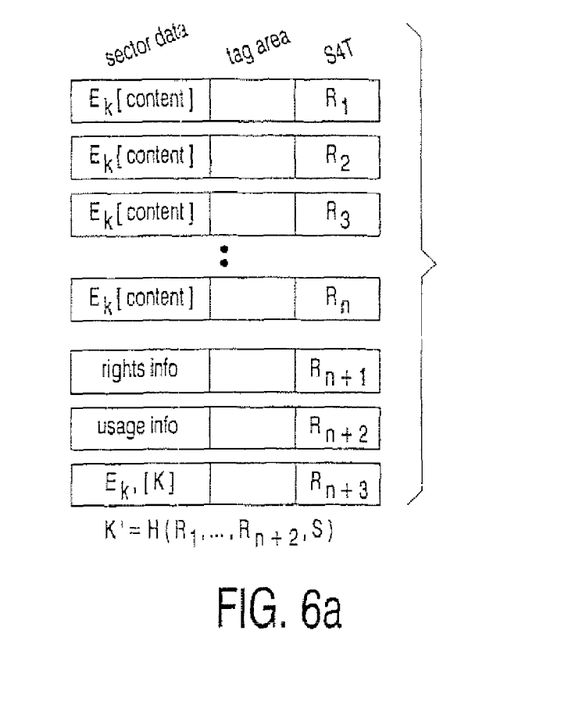
FIGS. 6A and 6B illustrate a further embodiment of the invention.

FIG. 6A illustrates a usage example of an S4T value in line with the above, with the sector data, the tag area data, and the random numbers $R_i$. On each playback of the content, the usage information is updated and checked against the rights. If the content has not been expired, the information is updated and re-stored and the key(s) used for content encryption re-encrypted using the new values of the S4T fields of the sectors in which the rights and usage information are stored. The content is encrypted with a secret key K. The encryption key K itself is stored after encryption with a key K', that is the result of a hash function H taking the S4T values $R_1, \ldots R_{n+2}$ and the secret S as arguments K may be multiple.

Figure 6B:
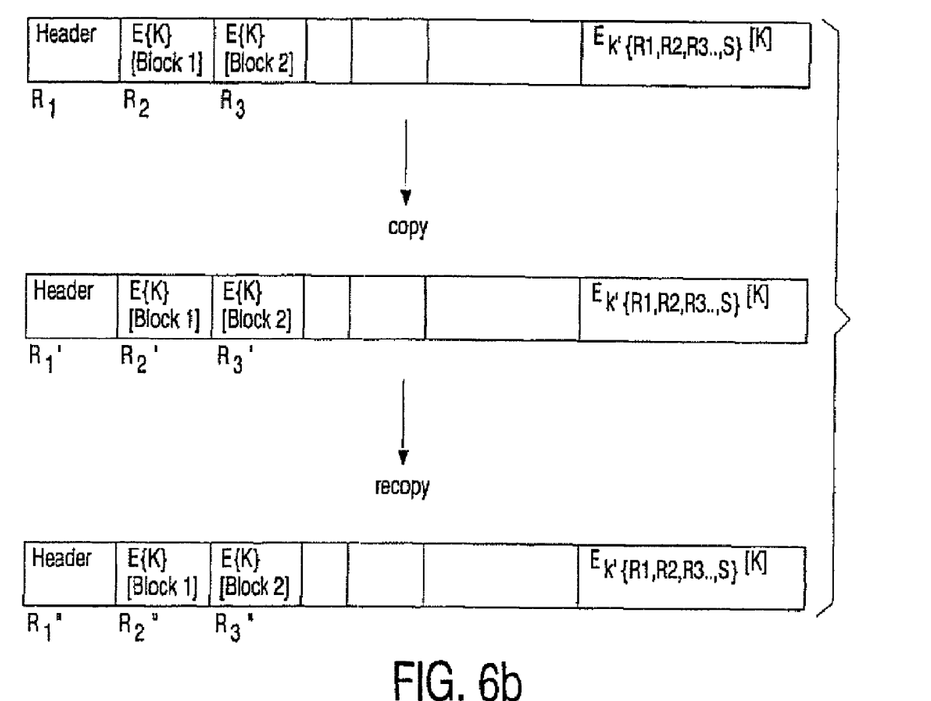

If the content is copied and recopied, the player will fail (as in the method illustrated in FIG. 5) to recover the keys because K' is changed in an intractable manner. This is schematically indicated in FIG. 6B. Accordingly any replay attack fails. The method does not necessitate the use of a unique identification code.

Thus copying is prevented in an inexpensive manner requiring only moderate processing facilities. It is noted that the invention provides the possibility of constructing a copy protection system without the need to use an unique identification code. This does not exclude the use of such a code for other reasons or for extra protection.

Figure 7:
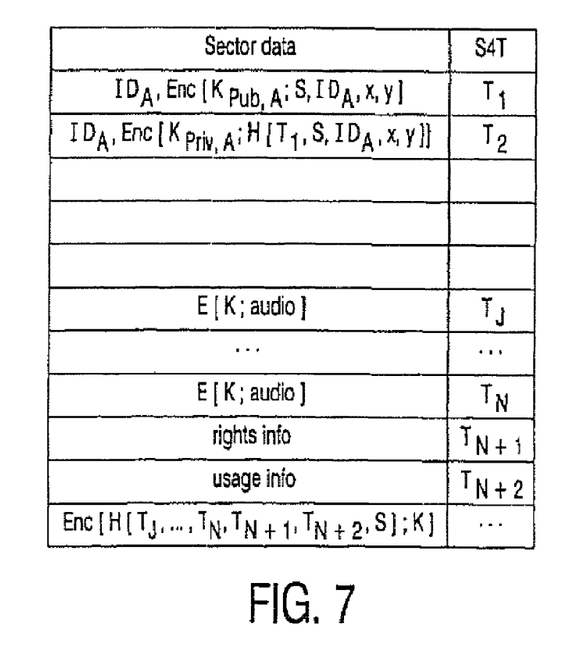
FIGS. 7-11 illustrate further embodiments of the method and system in more detail.
Figure 8:
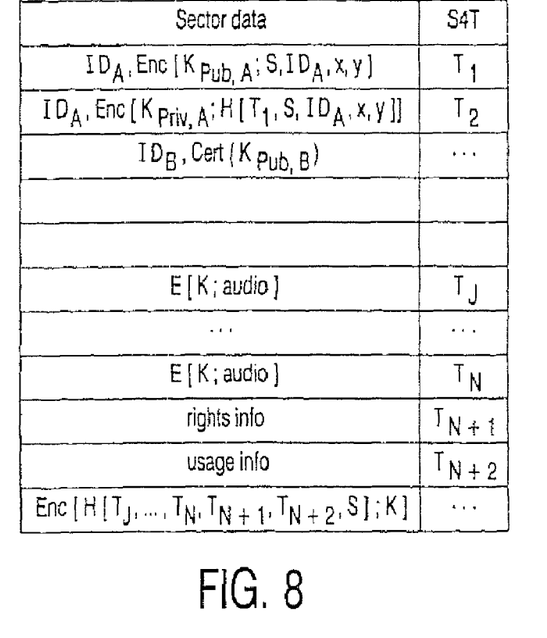
Figure 9:
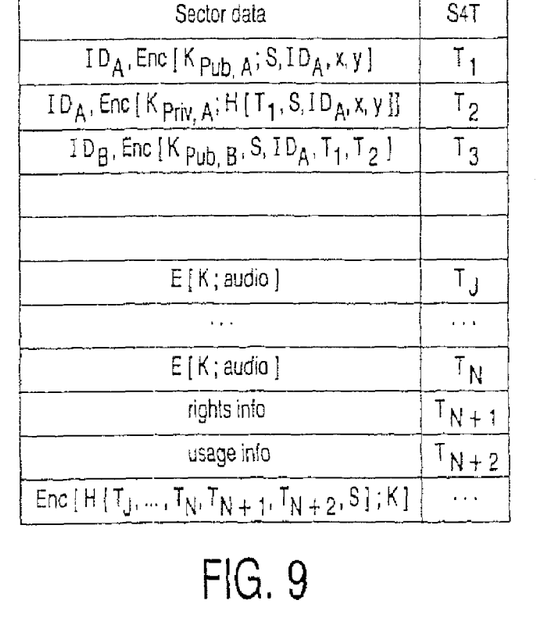
Figure 10:
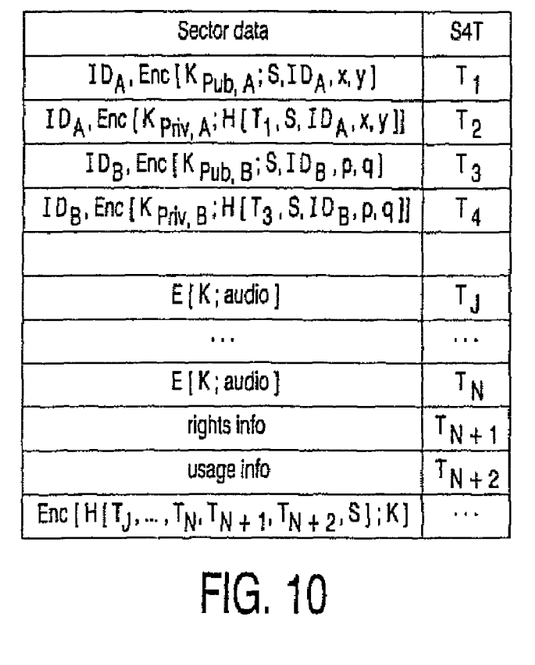
Figure 11:
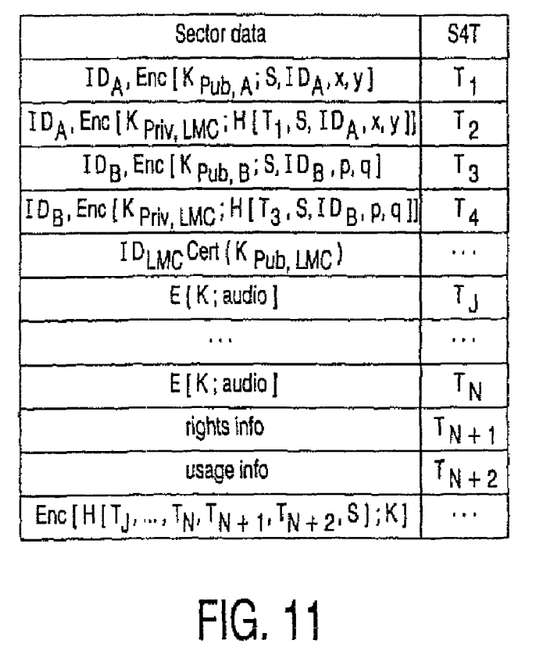

The embodiment shown in FIG. 5 in which each sector is encrypted with a key having different arguments, said arguments being formed by a number or a set of number $R_i$, has the advantage that each sector has its own separate key. Immediately after the said number has become available decryption can be commenced, thus decryption can be done fast. The embodiment shown in FIGS. 6 and 7 is, having a common key, which is dependent on the total set of random numbers. Decryption can only commence after all random numbers have been generated. This makes this method, compared to the first mentioned relatively slower, but because a larger set of random numbers is used, relatively safer.

It is also possible to arrange the data in groups of sectors, and groups of sectors having associated with it a random number $R_i$. The same schemes as above may be used for groups of sectors, instead of sectors. 'Random numbers' within the concept of the invention in its broadest sense means numbers which for all due purposes cannot be predicted in advance. 'Numbers' is to be broadly interpreted and may include any set of parameters from which a random choice is made. 'For all due purposes' is stated since to obtain random numbers usually some kind of algorithm is used. Although preferably the method is applied to all or substantially all data on the memory module, the invention encompasses embodiments in which the method is applied to only a part of the data on the memory module. This could for instance be advantageous from the point of view of speed of operation. The invention is not restricted to using one and only one encryption method. If the data are divided in groups, embodiments using different encryption methods and different ways of deriving keys from the random numbers in the S4T fields for said encryption methods may be used for different groups. This reduces the risk of unauthorized decryption. Although the controller may be provided in the system apart from the memory module, preferably the controller unit by which the random numbers (RNG) are chosen is integrated in the memory module. This makes it difficult to circumvent the method or to influence the generation of the random numbers.

The embodiment shown in FIG. 5 in which each sector is encrypted with a key having different arguments, said arguments being formed by a number or a set of number $R_i$, has the advantage that each sector has its own separate key. This makes unauthorized decryption very difficult. The embodiment shown in FIGS. 6 and 7 is, having a common key, relatively simpler which simplifies authorized decryption.

In short the invention may be described as follows:

In a method for providing copy-protection services on a storage medium (for instance a solid state memory module), the data are arranged in sectors to which a field (S4T) is associated, where said field contains a random value $R_i$ which is changed randomly when writing data to said sector. By encrypting the data stored on the medium using a key which depends critically on said random numbers, bit-by-bit copies (apart from said random numbers, which can not be deterministically changed by an application) to a second storage medium or recopies from some intermediate storage medium, can not be decrypted because the values of said random numbers will have changed, thus preventing unauthorized duplication and replay attacks.

The invention claimed is:

1. A process for providing copy-protection on a memory device, wherein stored data is arranged in sectors, each having a tagging part associated therewith, where the tagging part of each sector comprises at least one field wherein a value in said at least one field is randomly changed with each write access to at least one of said sectors wherein said field is read-only for external access, and said stored data is stored in encrypted form on said memory device, and wherein decryption of said stored data requires use of the randomly changed value.

2. The process as claimed in claim 1, characterized in that the memory device is a removable memory module.

3. The process as claimed in claim 1, characterized in that an encryption key used to encrypt stored data is derived from the values of the at least one field associated with sectors in which rights and/or usage information is stored.

4. The process as claimed in claim 3, characterized in that the encryption key is in addition derived from values of the at least one field associate with sectors in which the content is stored.

5. A system arranged for implementing a process as claimed in claim 1 comprising a controller unit for choosing the values at random.

6. A player for playing from a memory device prepared according to a process as claimed in claim 1.

7. A memory device prepared according to a method as claimed in claim 1 comprising a controller unit for choosing the random values.

8. A process utilizing a controller for providing copy-protection for data stored in data sectors on a memory device, a read-only for external access field being associated with each data sector for storing a value $R_i$, the process comprising using the controller to:
encrypt data written into at least a part of the data sectors on the memory device on the basis of an encrypted key which the controller encrypts, at least in part, using the value $R_i$ associated with said data sectors; and
randomly change the stored value $R_i$ associated with a data sector each time that the respective data sector on the memory device is written.

9. The process of claim 8 further comprising the step of using the controller to decrypt data read from storage in a data sector on the basis of the key that the controller derives, at least in part from the stored value $R_i$ associated with the sector.

10. The process of claim 8 wherein the controller is physically integrated within the memory device.

11. The process of claim 8 wherein the controller is located in a part of a data storage unit which is physically detachable from the memory device.

12. The process of claim 8 wherein the memory device is a disk.

13. The process of claim 9 wherein the memory device is a disk.

14. The process of claim 11 wherein the memory device is a disk.

15. A process utilizing a controller for providing copy-protection for data which is stored in data sectors on a memory device, a read-only for external access field being associated with each data sector for storing a value $R_i$, the process comprising using the controller to perform steps which, in combination:
function to encrypt data written into at least a part of the data sectors on the memory device on the basis of a key which the controller encrypts, at least in part, from the value $R_i$ associated with said data sector; and
function to randomly change the stored value $R_i$ associated with a data sector each time that the respective data sector on the memory device is accessed to write data.

16. A copy-protection system comprising in combination:
a data storage medium, which is organized to store data in data sectors, and data fields which are associated with each data sector for storing a respective value $R_i$, associated with said associated data sector, the data fields being read-only for external access and therefore cannot be modified deterministically by devices using the system;
a controller for providing copy-protection for data which is stored in the data sectors on the data storage medium, the controller including means which function to encrypt data written into at least a part of the data sectors on the storage medium on the basis of a key and means by which the controller functions to encrypt the key, at least in part, from the value $R_i$ associated with said data sector; and
means which function to randomly change the stored value $R_i$ associated with a data sector each time that the respective data sector on the storage medium is accessed to write data.

17. The system of claim 16 wherein the storage medium is a removable random access storage module.

18. The system of claim 16 wherein the storage medium is a disk.

19. A process for providing copy-protection services on a memory device, wherein stored data is arranged in sectors, a tagging part being associated with each sector, where the tagging part of said sector comprises at least one field that stores a value, that is randomly changed with each write access to said sector, wherein said field value is read-only for external access, and said stored data is stored in encrypted form on said data storage medium with a key that is at least in part derived from values of at least some of said fields.

20. A process for providing copy-protection on a memory device wherein stored data is arranged in sectors, a tagging part being associated with each sector, and the tagging part of each sector comprises at least one field that is randomly changed with each write access to at least one of said sectors, wherein said field is read-only for external access, and said stored data is stored in encrypted form on said memory device for decryption with a key and wherein said key is calculated using said randomly changed field.

21. A copy-protection system comprising in combination:
a data storage medium, organized to store data in read-write data sectors which are accessible by end-users and protected data fields which are inaccessible by end users;
a drive comprising means for reading data from and writing data to and from the data storage medium and for transmitting said data for external access by end-users and the read-write data sectors without restriction, and for reading and writing protected data from and to the protected data fields for restricted access by the drive, but not for access by the end-users; and a controller for providing cryptographic copy-protection control for data which is stored in the read write data sectors, the controller including means which function to encrypt data written into at least a part of the read write data sectors at least in part, on the basis of a protected data value $R_j$ stored in the protected data fields and means that function to randomly change the protected data value $R_i$ and for writing the changed value into the protected data fields each time that the data written into the read-write data sectors is encrypted by the controller.

22. The process according to claim 1, wherein the memory device is a disk.

23. The process according to claim 1, wherein the memory device is a solid state memory module.

24. The process according to claim 1, wherein the memory device is an optical disc.

25. The process according to claim 8, wherein the memory device is a solid state memory module.

26. The process according to claim 8, wherein the memory device is a removable memory module.

27. The process according to claim 8, wherein the memory device is an optical disc.

28. The process according to claim 15, wherein the memory device is a disk.

29. The process according to claim 15, wherein the memory device is a solid state memory module.

30. The process according to claim 15, wherein the memory device is a removable memory module.

31. The process according to claim 15, wherein the memory device is an optical disc.

32. The process according to claim 19, characterized in that the memory device is a disk.

33. The process according to claim 19, wherein the memory device is a solid state memory module.

34. The process according to claim 19, wherein the memory device is a removable memory module.

35. The process according to claim 19, wherein the memory device is an optical disc.

36. The process according to claim 20, characterized in that the memory device is a disk.

37. The process according to claim 20, wherein the memory device is a solid state memory module.

38. The process according to claim 20, wherein the memory device is a removable memory module.

39. The process according to claim 20, wherein the memory device is an optical disc.

\* \* \* \* \*